(12) United States Patent
Prat et al.

(10) Patent No.: US 6,804,349 B1
(45) Date of Patent: Oct. 12, 2004

(54) HYBRID TRANSCEIVER CIRCUIT

(75) Inventors: Gildas Prat, Grenoble (FR); Alain Chianale, Saint Egreve (FR)

(73) Assignee: STMicroelectronics S.A., Montrouge (FR)

( * ) Notice: Subject to any disclaimer, the term of this patent is extended or adjusted under 35 U.S.C. 154(b) by 542 days.

(21) Appl. No.: 09/652,605

(22) Filed: Aug. 30, 2000

(30) Foreign Application Priority Data

Aug. 30, 1999 (FR) .............................. 99 10990
Feb. 22, 2000 (FR) .............................. 00 02192

(51) Int. Cl.[7] .............................................. H04M 1/00
(52) U.S. Cl. ................................... 379/402; 379/390.04
(58) Field of Search ...................... 379/406.01, 406.02, 379/406.08, 406.14, 406.12, 390.04, 402, 403, 404, 392.01; 370/286, 290, 291

(56) References Cited

U.S. PATENT DOCUMENTS

| | | | |
|---|---|---|---|
| 5,271,060 A | * 12/1993 | Moran, III et al. | 379/403 |
| 5,388,092 A | * 2/1995 | Koyama et al. | 379/411 |
| 5,528,630 A | 6/1996 | Ashley et al. | 375/258 |
| 5,841,841 A | 11/1998 | Dodds et al. | 379/93.08 |
| 6,373,908 B2 | * 4/2002 | Chan | 375/346 |

FOREIGN PATENT DOCUMENTS

WO    WO 93 09612    5/1993

* cited by examiner

*Primary Examiner*—Rexford Barnie
(74) *Attorney, Agent, or Firm*—Lisa K. Jorgensen; Timothy L. Boller; Seed IP Law Group PLLC

(57) ABSTRACT

A hybrid circuit forming an interface between a transmission line and heads of transmission-reception of signals in bands of different frequencies in transmission and reception, including a line transformer, and means for separating bands combined with echo cancellation means.

23 Claims, 6 Drawing Sheets

HYBRID TRANSCEIVER CIRCUIT

BACKGROUND OF THE INVENTION

1. Field of the Invention

The present invention relates to the field of hybrid circuits of conversion and isolation between a transmission line (for example, a telephone line) and a user equipment or a collective equipment (for example, a telephone exchange or an Internet-type network provider). The present invention more specifically relates to hybrid 2 wire-4 wire circuits that are intended for enabling the sending and receiving of a wanted signal on a same transmission line, and that use a transformer. The function of such hybrid circuits is, in particular, to effect an echo cancellation function to avoid that a signal, extracted towards a receive head, be polluted by an echo coming from a signal transmitted on the line.

2. Discussion of the Related Art

FIG. 1 very schematically shows an example of application of the hybrid circuits to which the present invention applies. This drawing illustrates the connection of different equipment on a telephone line 1 and, more specifically, the connection of equipments on the subscriber side. Line 1 generally is a twin-wire line between a telephone exchange 2 and a connection element 3 on the subscriber side. To simplify, a telephone exchange 2 is considered, but it should be noted that the line transits through different collective equipment such as sub-terminal blocks, terminal blocks, etc. On the subscriber side, connection element 3 may be formed of a separator for branching the telephone line either to a telephone set 4, or to a modem 5 connected to a digital equipment 6, for example, a microcomputer. Other configurations than those described hereabove may of course exist on the subscriber side and on the collective system side. However, their detailed discussion would add nothing to the discussion of the present invention and will be accordingly omitted since it is perfectly well known.

Be it on the exchange side or on the subscriber side, the equipment are equipped with a hybrid circuit 7 used as an interface between the telephone line and the high frequency or RF signal processing circuits. Most often, telephone sets are also equipped with hybrid circuits. However, the present invention only applies to circuits intended for carrying data in bands of frequencies greater than speech frequencies.

FIG. 2 schematically shows a hybrid circuit 7 to which the present invention applies. As indicated previously, this circuit is intended for enabling the sending and the receiving of a wanted signal on a same twin-wire line 1. On the side of line 1, hybrid circuit 7 includes two inputs/outputs Rx+ and Rx−. On the equipment side, hybrid circuit 7 includes two inputs Tx+ and Tx− intended for receiving a signal to be transmitted on the line, and two outputs E+ and E− intended for giving back a received signal. The inputs and outputs on the equipment side are intended for being connected to heads of transmission and reception of high frequency signals (not shown in FIG. 2), most often based, for the portion in contact with hybrid circuit 7, on low-noise amplifier circuits. Both terminals Rx+ and Rx− on the line side are generally formed by the two terminals of a first winding of an isolation transformer, having the terminals of its second winding connected to an impedance matching and echo cancellation circuit enabling conversion towards the 4-wire system on the equipment side. The impedance matching portion has the function of adapting the transformer input on the equipment side with the line impedance. The echo cancellation portion has the function of suppressing, from a received signal sent to outputs E+ and E−, an echo coming from a transmission from terminals Tx+ and Tx− towards terminals Rx+ and Rx−. In a hybrid circuit intended for a transmission-reception of data, it is desired to obtain the smallest possible echo.

The present invention more specifically relates to hybrid circuits intended for the transmission-reception of high frequency signals in separate bands, that is, where the frequency band assigned to the transmission is different from the frequency band assigned to the reception. In such applications, the signals received% and provided by hybrid circuit 7 on terminals E+ and E− are generally filtered (for example, in a high-pass filter for the subscriber side) to improve the echo attenuation.

FIG. 3 shows a conventional example of a hybrid circuit 7 applied to a transmission in separate bands. As previously indicated, the interface between line 1 and an impedance matching and echo cancellation circuit 10 is formed by a transformer 8, having a first winding 9 (arbitrarily designated as the primary winding) connected to line 1. In FIG. 3, the telephone line has been schematized by its impedance ZL across terminals Rx+ and Rx− of winding 9 of transformer 8.

On the side of secondary winding 11, the impedance matching portion of circuit 10 is essentially formed of two resistors Ra, called transmission drive resistors, connecting each terminal Tx+, Tx− to one of terminals A, B of winding 11. Terminals Tx+ and Tx− correspond to differential output terminals of a high frequency transmission head 12. Generally, resistors Ra are sized according to the real part of line impedance ZL and to transformation ratio N of transformer 8. Indeed, transformer 8 most often has a transformation ratio different from one to provide an increase of the voltage level in the transmission direction from the user to the exchange. Generally, $Ra=RL/2N^2$, where RL represents the resistance of line impedance ZL.

The echo cancellation function is effected by using the differential structure to extract, from the received signal, the echo of the transmitted signal. For this purpose, each terminal Tx+ and Tx− is connected to the terminal B or A opposite to that to which it is connected by resistor Ra, by means of a series association of two impedances Z1 and Z2. Output terminals E+ and E− of the hybrid circuit are then formed by the respective midpoints of the series associations of impedances Z1 and Z2. Thus, terminal Tx+ is connected to terminal E− by an impedance Z1 and terminal E− is connected to terminal B by an impedance Z2. Terminal Tx− is connected to terminal E+ by an impedance Z1 and terminal E+ is connected to terminal A by an impedance Z2. The transfer function thus obtained enables that the voltage across terminals E+ and E− corresponds to the voltage across terminals A and B, decreased (at least partly) by the transmission voltage across terminals Tx+ and Tx−.

Such an echo cancellation circuit 10 operates properly if line 1 exhibits its characteristic impedance, that is, if it can be assimilated to a resistor. In this case, with $Z1=2Z2$, a perfect echo cancellation is obtained with purely resistive impedances.

However, the frequency of the received signal (and of the transmitted signal) varies, so that line 1 cannot be assimilated to a pure resistor. Further, the line impedance varies from one line to another, in particular according to the line length. Accordingly, the echo cancellation circuit cannot be formed of resistors only.

In conventional systems, impedances Z1 and Z2 are called compromise impedances since they are chosen according to a characteristic batch of telephone lines, generally imposed by telecommunication standards. A compromise sizing of the hybrid circuit is thus performed. The compromise impedances generally have the shapes respectively illustrated in FIGS. 4A and 4B, for impedances Z1 and Z2. Impedances Z1 are formed of a first resistor R1 in series with a capacitor C1, this in parallel with a second resistor R1' (FIG. 4A). Impedances Z2 are generally formed of a resistor R2 in series with a capacitor C2 (FIG. 4B).

A first disadvantage of known circuits is that the use of compromise impedances does not allow perfect echo cancellation.

Further, in the case of a data transmission in separate bands, the spectral transmission properties result in additional difficulties due to the large width of the frequency bands transiting through the hybrid circuit. For example, for high-rate data transmission systems on asymmetrical digital subscriber lines (ADSL), that is, having a different transmission rate according to the transmission direction, the frequency spectrum used ranges from 20 kHz to 1.1 MHz.

In this example, a first frequency band from 0 to 20 kHz is dedicated to speech. A second frequency band (from 20 kHz to 1.1 MHz) intended for data transmission is itself divided in two according to the transmission direction. In a so-called "upward" direction, that is, from the user to a collective equipment (for example, an Internet provider), the transmission occurs in the band from 20 kHz to 138 kHz. In the so-called "downward" direction, that is, from the collective equipment to the user equipment, the frequency band used ranges from 138 kHz to 1.1 MHz. The width difference between the upward and downward bands is linked to the desired rate difference between the two transmission directions. In such asymmetrical systems, the data rate is, for example, on the order of 500 kilobits per second in the upward direction and on the order of 1.5 to 6 megabits per second in the downward direction.

To improve the echo cancellation by means of a hybrid circuit such as illustrated in FIG. 3, a high-pass filter 13 is generally provided on the subscriber side, between output terminals E+ and E− of circuit 10 and a receive head 14. The function of filter 13 is to cut-off the frequencies under the frequency band used in reception (for example, the frequencies under 138 kHz).

A disadvantage of using a high-pass filter 13 at the output of hybrid circuit 7 is that this introduces impedance matching problems between circuit 7 and filter 13.

It should be noted that a digital filtering solution cannot be provided due to the large bandwidth, combined with the resolution of the analog-to-digital conversion that is necessary to be obtained due to the mixing of the transmitted and received signals and to the relative high level of the transmitted signal.

It should further be noted that, for reasons of noise and dynamics, filter 13 is generally formed by means of discrete inductive and capacitive components.

Another problem that is raised in the context of high-rate asymmetrical transmissions is that the signal to be transmitted is of high level while the received signal has a very low level (especially for long lines, for example of more than 4–5 km, resulting in a strong attenuation). In the transmission direction, the voltage increase effected by the transformer is compatible with the needs of high-rate transmissions that require a high transmission power to overcome the noise levels. However, in the reception direction, the attenuation effected by the line transformer adversely affects the system operation. Indeed, the signal receiver must then have, at its input, a noise source of very low level, which makes its implementation difficult. The noise voltage, at the receiver input, must be all the smaller as the voltage is low across the transformer (the winding located on the equipment side).

The document EP-A-0 678 979 discloses an hybrid circuit of the same type as the present invention. This circuit comprises means for separating frequency bands transmitting data (40 kHz–1.7 MHz) from the vocal bands (<4 kHz). Echo-cancelling means are provided and are distinct from impedance circuits associated with line transformer. A separation between the transmission and reception bands is provided downstream from the transmission/reception heads with respect to the line.

SUMMARY OF THE INVENTION

According to a first aspect, the present invention aims at providing a novel solution for suppressing the echo in a separate band transmission system that overcomes at least one disadvantage of known solutions.

The present invention aims, more particularly, at providing a novel hybrid circuit for high-rate separate band data transmission.

The present invention also aims at providing a solution that suppresses the use of compromise impedances.

According to a second aspect, the present invention further aims at making less critical the reception noise problem and, in particular, at enabling, with respect to a conventional transformer, an increase of the level of the received signal without adversely affecting the increase of the transmitted signal effected by the line transformer.

To achieve these objects, the present invention provides a hybrid circuit forming an interface between a transmission line and heads of transmission-reception of high frequency signals in bands of different frequencies in transmission and reception, including a line transformer, and means for separating transmission/reception bands combined with echo cancellation means.

According to an embodiment of the present invention, the band separating means are formed of a filter having two first input impedances directly connected, respectively, to two end terminals of a first winding of the transformer.

According to an embodiment of the present invention, two second input impedances of the filter are directly connected, respectively, to two input terminals of the circuit, intended for receiving a signal to be transmitted.

According to an embodiment of the present invention, the sizing of the filter and of the echo cancellation means components is independent from the impedance of the line and from the transformation ratio of the transformer.

According to an embodiment of the present invention, the filter is of third order.

According to an embodiment of the present invention, the circuit includes, in series between each end terminal of the first winding of the transformer and one of said two input terminals of the circuit, a first and a second input impedance of the filter, the midpoints of these series associations being connected to each other by an LC cell, and each midpoint being connected, via a capacitive or inductive element of an output impedance of the filter, directly to one of two output terminals of the circuit that are interconnected by a resistor common to both output impedances.

According to an embodiment of the present invention, each input impedance includes a series association of a resistor with a parallel assembly of a first capacitor and of an inductance, the respective midpoints of the series associations of the two first and the two second input impedances being connected to each other by a second capacitor, and said associations belonging to each first input impedance being connected in series with one of said associations belonging to the two second input impedances, the midpoints of these series connections being directly connected to one of two output terminals of the circuit that are connected to each other by a resistor.

According to an embodiment of the present invention, each input terminal of the circuit is connected, by a drive resistor depending on the impedance of the line and on the transformation ratio of the transformer in transmission, to a terminal of the first winding of the transformer.

According to an embodiment of the present invention, the band separating means are formed of a high-pass filter.

According to an embodiment of the present invention, the band separating means are formed of a low-pass filter.

According to an embodiment of the present invention, the first winding of the transformer is formed of at least three series windings, the respective numbers of spirals of which are a function of the desired transformation ratios in transmission and reception, a transmission signal being applied across the terminals of a central winding while a reception signal is sampled across the end terminals of the series association of the windings.

The foregoing objects, features and advantages of the present invention will be discussed in detail in the following non-limiting description of specific embodiments in connection with the accompanying drawings.

DETAILED DESCRIPTION

Figure 1:
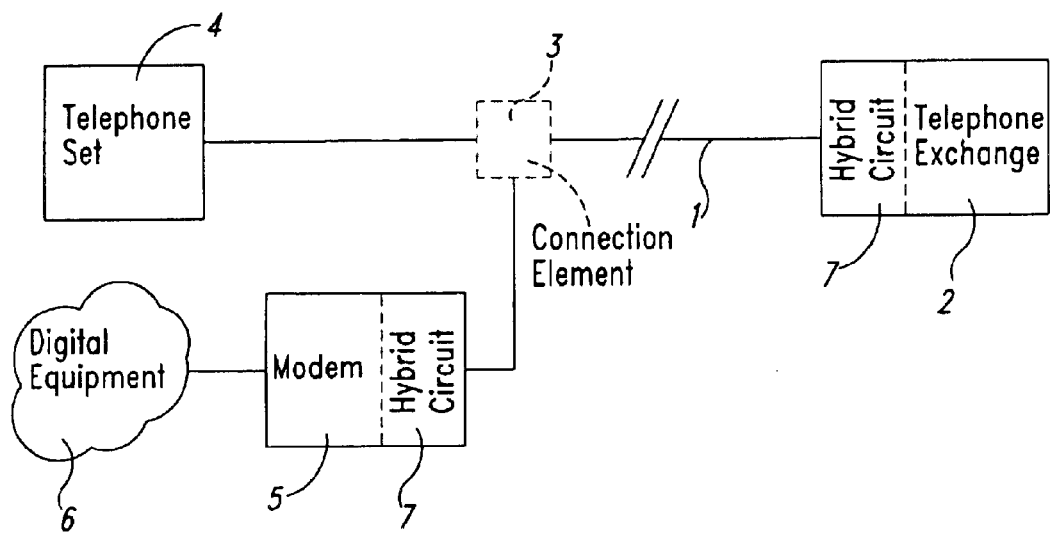
FIGS. 1, 2, 3, 4A, and 4B, previously described, are meant to show the state of the art and the problem to solve.
Figure 2:
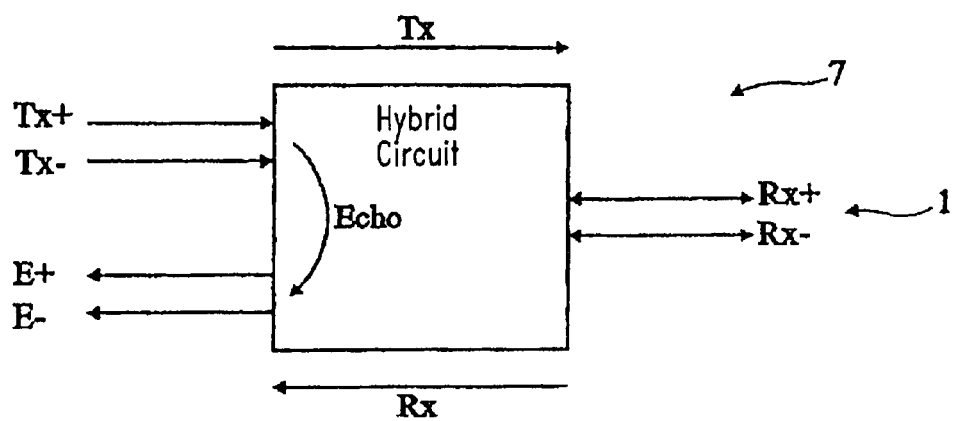
Figure 3:
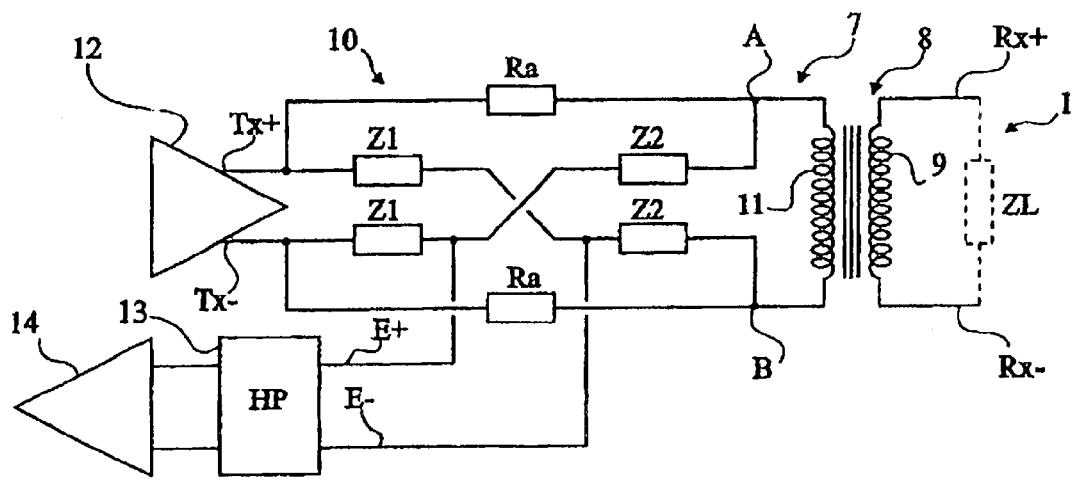
Figure 4A:
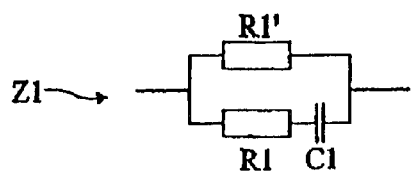
Figure 4B:
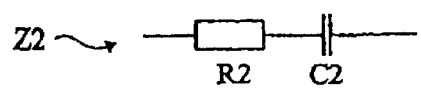

The same elements have been designated with the same references in the different drawings. For clarity, only those elements that are necessary to the understanding of the present invention have been shown in the drawings and will be described hereafter. In particular, the details constitutive of the high frequency transmission-reception heads as well as the transmission and reception data processing systems have not been detailed and are no object of the present invention.

A feature of the present invention is to provide a separation of the frequency bands upstream of the echo cancellation circuit. Thus, according to the present invention, it is provided to take advantage of the fact that the data transmission is performed in separate bands to suppress, as close as possible to the line, the frequencies that do not correspond to the reception band. According to the present invention, the band separation is performed in the hybrid circuit, as close as possible to the transformer.

Figure 5:
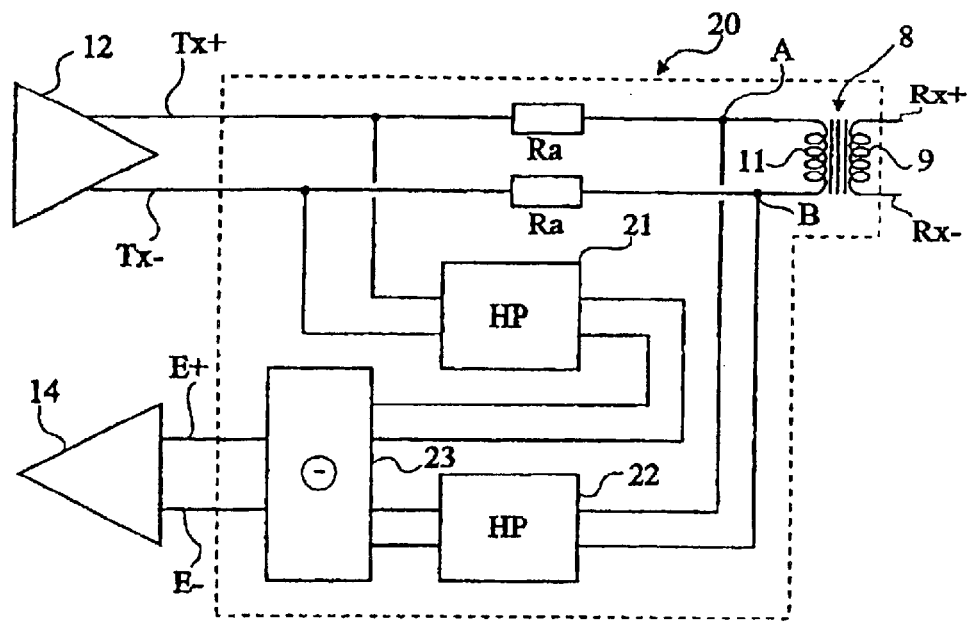
FIG. 5 shows, in the form of block diagrams, a first embodiment of a hybrid circuit intended for a user equipment according to the present invention.

FIG. 5 very schematically shows in the form of blocks an embodiment of the present invention. The representation of FIG. 5 is functional, that is, it aims at having the principle used by the present invention understood, rather than the detailed structure of a hybrid circuit that will be better understood in relation with FIGS. 7 to 10.

As previously, a hybrid circuit 20 of the present invention is based on the use of a transformer 8 having a first winding 9 connected by its two terminals Rx+ and Rx− to a transmission line (not shown) and having a second winding 11 located on the user equipment side. Conventionally still, hybrid circuit 20 is intended for being associated with heads 12 and 14 of transmission and reception of high frequency signals, having differential structures. On the user equipment side, hybrid circuit 20 includes two input terminals Tx+ and Tx− corresponding to the outputs of transmission head 12 and intended for the high frequency signals to be transmitted towards the line. Circuit 20 also includes two output terminals E+ and E− for providing the received signals from the line, after cancellation of the echo of the transmitted signals.

As in a conventional hybrid circuit, terminals Tx+ and Tx− are each connected, via an impedance matching resistor Ra, to one of terminals A, B of winding 11 of transformer 8.

A feature of the present invention is that, functionally, the rest of the hybrid circuit is formed by a filter formed of elements 21 and 22, the respective inputs of which sample signals Tx+ and Tx− and the signals across terminals A and B of transformer 8. In the embodiment illustrated by FIG. 5 which applies to a hybrid circuit placed on the user equipment side, the filter is a high-pass filter. Elements 21 and 22 are here intended for only letting through the frequency band corresponding to reception and for rejecting the transmission band. The outputs of filters 21 and 22 are sent into a subtractor 23 having the function of ending the echo cancellation. The outputs of subtractor 23 form terminals E+ and E− of hybrid circuit 20 of the present invention and are, preferably, directly sent onto a conventional high frequency reception head 14. It can be considered that the real echo is sampled from terminals A and B while an estimated echo is present on terminals Tx+ and Tx−.

Thus, the present invention combines the band separation and echo cancellation functions in a same circuit. The fact of performing the band separation as close as possible to the transformer and upstream of the echo cancellation subtractor results in having this echo already practically completely suppressed by the filtering.

Figure 6:
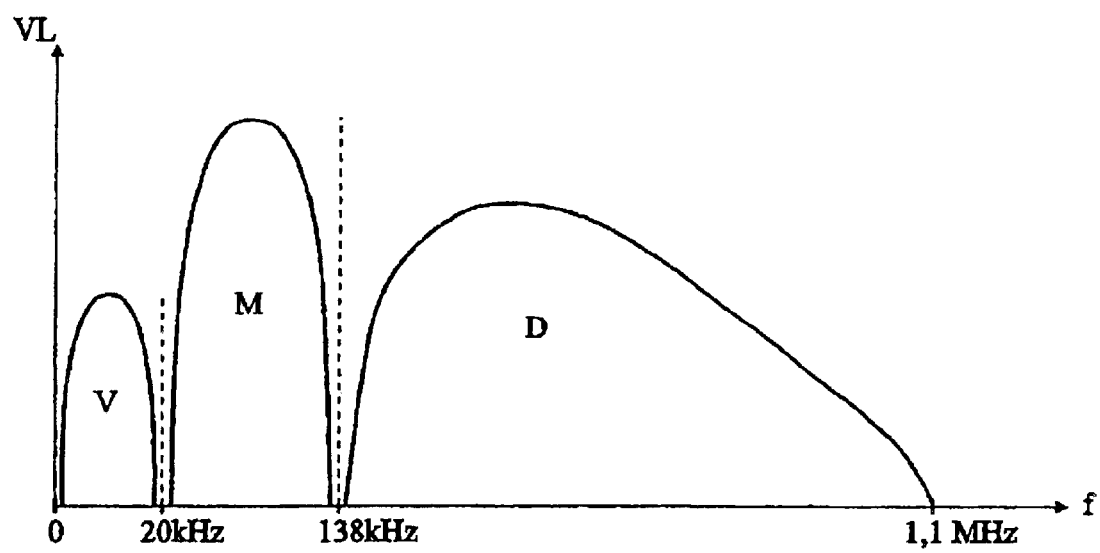
FIG. 6 illustrates the spectral characteristic of a data transmission system to which the present invention applies.

FIG. 6 shows the spectral characteristic (for example, line voltage VL according to frequency) of a data transmission system to which the present invention applies. This is, for example, a high-rate data transmission system, for example on an asymmetrical digital subscriber line. As illustrated in FIG. 6, a first frequency range V (for example from 0 to 20 kHz) is intended for speech and is generally directed to a telephone set upstream of hybrid circuit 20, for example, by means of separator 3 of FIG. 1.

The rest of the spectrum is intended for data transmissions. A first frequency band M is intended for the upward direction, that is, from the user to the collective system and corresponds, in the example of FIG. 5, to transmitted signals Tx. A second band D is intended for the downward direction, that is, from the collective system to the user and corresponds, in the example of FIG. 5, to reception. In the example shown in FIG. 6, band M extends from 20 kHz to approximately 138 kHz, and band D extends from 138 kHz to approximately 1.1 MHz. Although FIG. 6 is not to scale, the highest level associated with range M symbolizes the amplification performed by the line transformer.

According to the embodiment of the present invention applied to a hybrid circuit on the user equipment side, high-pass filtering system 21, 22 of hybrid circuit 20 is sized to cut-off the frequencies of bands V and M.

Figure 7:
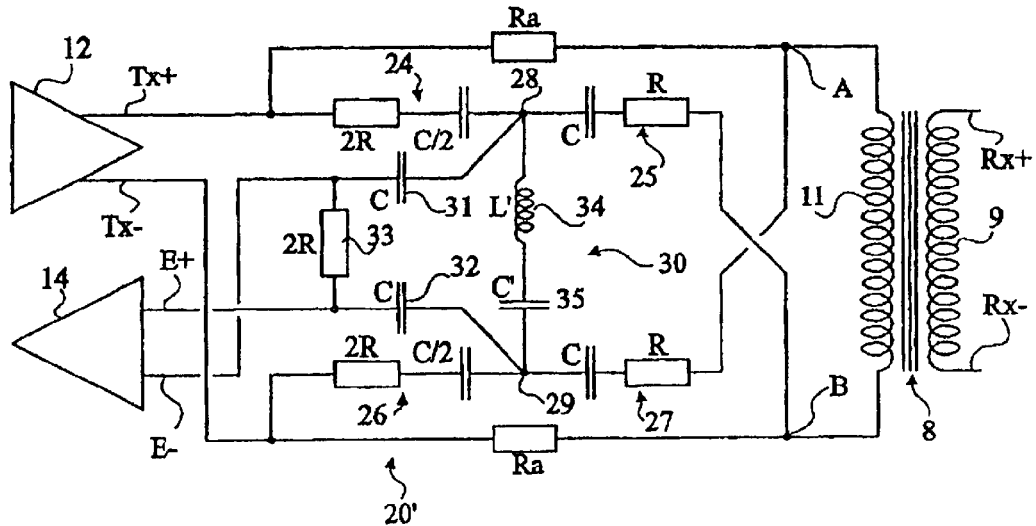
FIG. 7 shows a detailed diagram of a hybrid circuit for a user equipment according to a first embodiment of the present invention.

FIG. 7 shows a first detailed embodiment of a hybrid circuit 20' according to the present invention. The diagram of FIG. 7 applies to a hybrid circuit on the user side, that is, for which the transmission corresponds to the lower band (M, FIG. 6) and the reception corresponds to upper band D.

In the embodiment of FIG. 7, each terminal Tx+, Tx− is connected to the terminal, respectively B, A, opposite to that to which it is connected by a resistor Ra, by a series association of two RC circuits, respectively 24 and 25 between terminal Tx+ and terminal B and 26 and 27 between terminal Tx− and terminal A. Each RC circuit is formed of a series association of a resistor with a capacitor. According to the present invention, each RC circuit 24, 25, 26, 27 forms not only an element of the echo cancellation subtractor, but also an input impedance of a high-pass filter which, in this example, is of order 3. It can be considered that impedances 24 and 26 define the input impedances of the estimated echo while impedances 25 and 27 define the input impedances of the real echo. The respective midpoints 28 and 29 of the series associations of circuits 24, 25, and 26, 27 are interconnected by a series LC circuit 30 constitutive of the filter. Node 28 is also connected, via a capacitor 31, to terminal E−, and node 29 is connected, via a capacitor 32, to terminal E+. Terminals E− and E+ are further interconnected by means of a resistor 33. Capacitors 31 and 32 form, with resistor 33, output impedances of the filter. LC circuit 30, formed of an inductance 34 and of a capacitor 35 in series, only has the function of taking part in the filtering function. Thus, only RC circuits 24, 25, 26, 27, capacitors 31, 32, and resistor 33 have a double function, which is to take part in the forming of the subtractor and in an input or output impedance of the filter, here of third order.

The respective values of the resistors and capacitors constitutive of RC circuits 24, 25, 26, and 27 are independent from the transformation ratio of transformer 8 and are chosen according to the pass-band of the filter to be implemented. These values must however respect the desired subtraction function. To obtain such a transfer function, assuming that the resistors and capacitors of circuits 25 and 27 have as respective values R and C, the resistors and capacitors of circuits 24 and 26 will then have as respective values 2R and C/2. Similarly, capacitors 31 and 32 will have C as a value and resistor 33 will have 2R as a value. Inductance 34 of value L' and capacitor 35 of value C' are independent from the subtraction function and will be sized according to the characteristics desired for the filtering only.

The values to be given to the different components of a hybrid circuit according to the present invention are within the abilities of those skilled in the art based on the characteristics desired for the filter, by using conventional filter synthesis tools (for example, tables).

An advantage of the present invention is that it decreases the number of discrete components necessary to implement the filtering and echo cancellation functions. Indeed, as previously indicated, some components are now shared by the two functions.

Another advantage of the present invention is that it suppresses the usual use of compromise impedances. Indeed, the impedances are now sized for the filtering function and not according to the characteristic impedances of the lines. This is due to the fact that the filtering is functionally performed upstream of the echo cancellation.

The present inventors have further found that the reception attenuation, caused by the combination of the echo cancellation and of the filtering, is less important than in a conventional assembly associating a hybrid circuit with a filter downstream thereof.

The present inventors have also acknowledged a substantial improvement (on the order of 20 dB) of the echo rejection on a nominal resistive load, this while the transmission gain is not altered and the reception gain is improved.

Figure 8:
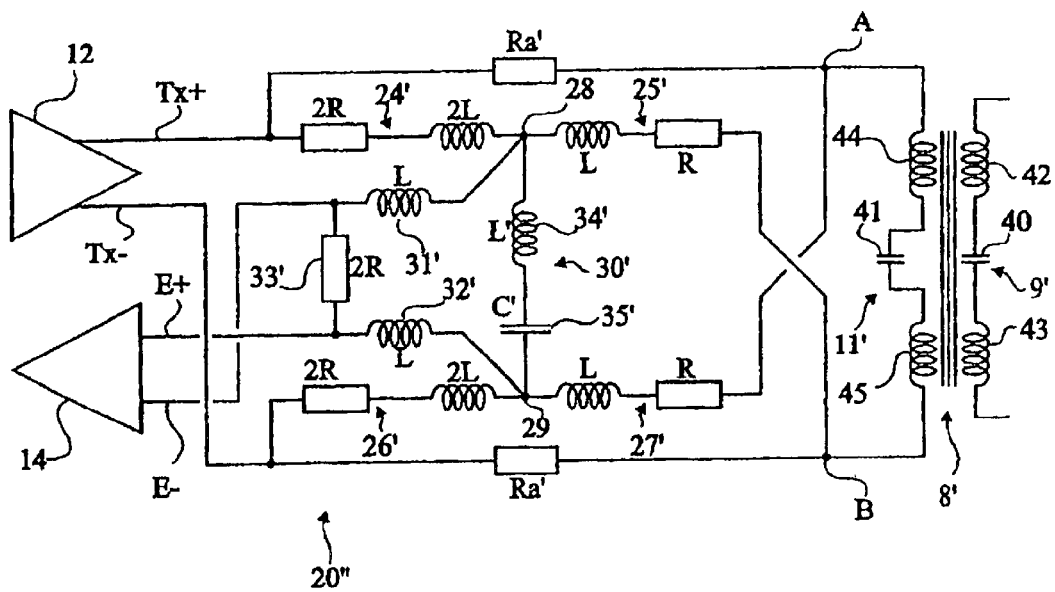
FIG. 8 shows a detailed diagram of a hybrid circuit for a collective equipment according to a second embodiment of the present invention.

FIG. 8 shows a second embodiment of a hybrid circuit 20" according to the present invention intended, here, to be placed on the telephone exchange or collective equipment side and no longer on the user equipment side. A significant difference is that, on the collective equipment side, the filtering to be performed to suppress the transmission echo now is a low-pass filtering instead of a high-pass filtering. Indeed, band M transmitted by a user is desired to be recovered in reception (for example, by means of a hybrid circuit 20' such as illustrated in FIG. 7), band D corresponding to the transmission band.

The structure of circuit 20" of FIG. 8 is similar to that discussed in relation with FIG. 7. The only differences are Pr that RC circuits 24, 25, 26 and 27 are replaced with RL circuits 24', 25', 26', and 27' and that capacitors 31 and 32 are, in this embodiment, replaced with inductances 31' and 32', terminals E+ and E− being interconnected by a resistor 33'. Of course, for a low-pass filter sizing, inductance 34' and capacitor 35' in series, constitutive of central filtering element 30', will have values different from those of the assembly of FIG. 7. As for the embodiment of FIG. 7, the transmission drive resistors Ra' depend on the transformation ratio of transformer 8' and on the line impedance (not shown).

It should be noted that, as previously, the respective values of the components of the filter and of the echo cancellation element are independent from the transformation ratio. Thus, taking a value R for the resistances of circuits 25' and 27', a value 2R will be used for the resistances of circuits 24' and 26', and for resistance 33'. Similarly, for a value L of the inductances of circuits 25' and 27', a value 2L will be used for the inductances of circuits 24' and 26' and a value L will be used for inductances 31' and 32'. To have their respective functions better understood, the different components of impedances 24', 25', 26', 27', and 30' have been assigned values identified by the same letters as in FIG. 7, although values R, L', and C' are in practice different from one embodiment to the other. Letters R, L, and C identify the values of the impedances depending not only on the desired response for the filter but also on the desired cancellation function (and on the characteristic lines impedances) while letters L' and C' identify the values only depending on the desired filter response.

In the embodiment of FIG. 8, each winding 9' and 11' of transformer 8' has been shown with an inserted capacitor, respectively 40, 41, between two portions 42, 43, and 44, 45 of the winding. This is a perfectly conventional structure of a line transformer, the function of which is to perform a high-pass filtering to suppress band V (FIG. 6) corresponding to speech. The use of one or the other of the embodiments of the line transformer of FIGS. 7 and 8 has no incidence on the present invention.

Such an alternative embodiment is however preferable in the embodiment of FIG. 8, since band V is not suppressed by the internal filter of the circuit according to the present invention, which is, in this case, a low-pass filter. However, band V may have been filtered upstream (separator 3, FIG. 1).

It should be noted that the conventional filtering of band V in the transformer cannot be a solution, even partial, to the problems that the present invention aims at solving. Indeed, within the transformer, the two transmission directions are touched by the filter. Accordingly, a transposition to the band separation of the present invention must be discarded.

It should also be noted that, in practice, LC circuits 30 and 30' of the filters of FIGS. 7 and 8 may be formed by circuits formed of two resistors in series between which a capacitor is interposed, or of an inductance divided in two parts forming a transformer across which capacitor 35 (or 35') is connected.

The relation linking the value of the transmission drive resistors (Ra, FIG. 7 and Ra', FIG. 8) to the transformer and to the line conventionally is Ra (or Ra') $=RL/2N^2$, where RL represents the characteristic line resistance and where N represents the transformation ratio of the transformer of the hybrid circuit.

Figure 9:
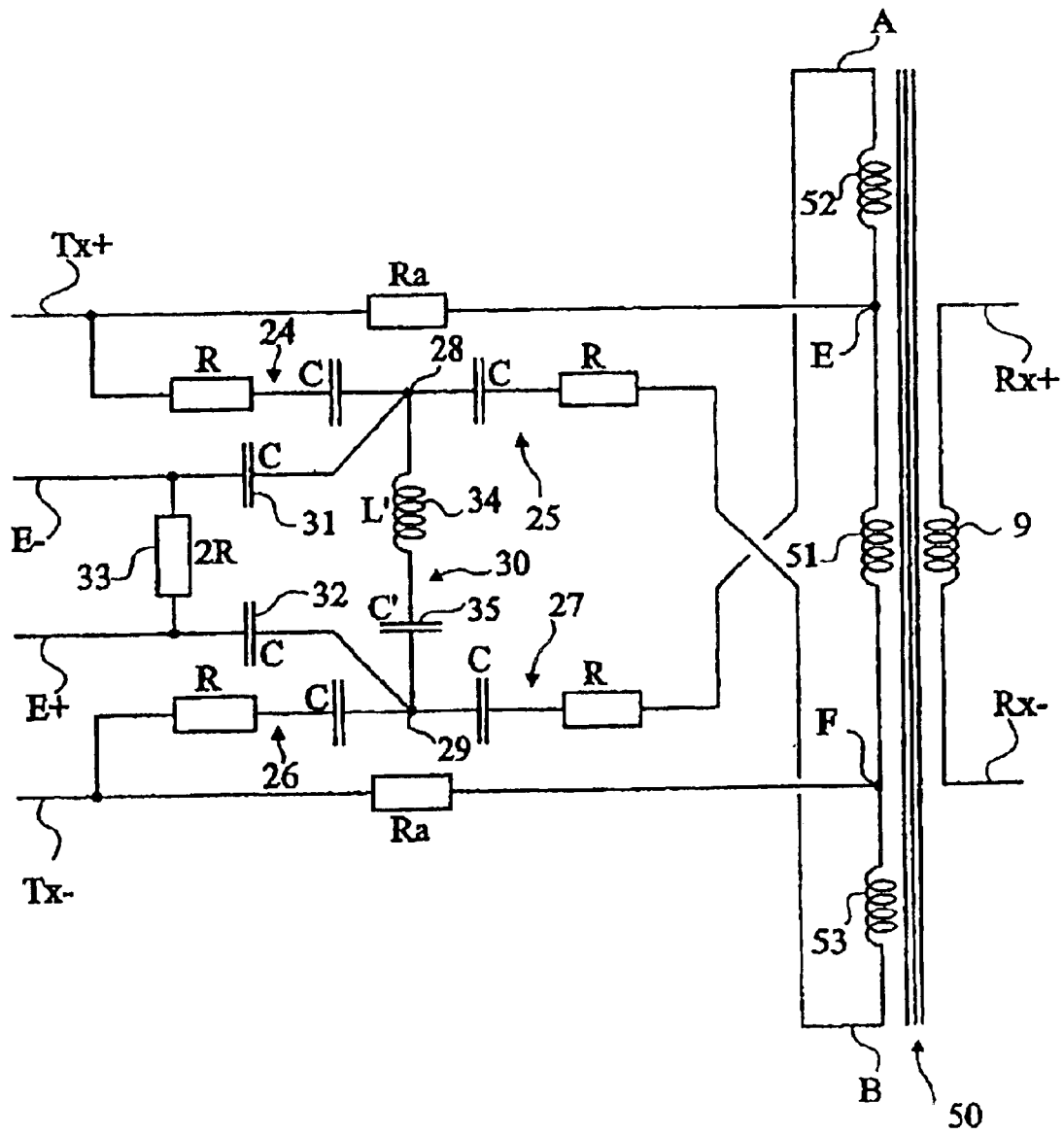
FIG. 9 shows a third embodiment of a hybrid circuit intended for a user equipment illustrating a second aspect of the present invention.

FIG. 9 shows a third embodiment of the present invention that further aims at fulfilling another object, which is to improve the reception signal level. The example of FIG. 9 has been taken in relation with a user equipment, that is, an equipment associated with a high-pass filter.

According to this embodiment, a transformer 50 including, on the equipment side, three windings 51, 52, 53 in series is used. A central winding 51 is intended for taking part in the transmission, that is, its terminals E and F are connected, via resistors Ra of the hybrid circuit, to terminals Tx+ and Tx−. End windings 52 and 53, associated in series with winding 51, are intended for taking part in the reception. On the line side, transformer 50 includes a winding 9 connected to terminals Rx+ and Rx− as in the embodiment of FIG. 7.

The use of a line transformer such as illustrated in FIG. 9 enables not attenuating the reception signal voltage while causing an elevation of the transmission voltage. For this purpose, the transmission transformation ratio is linked to the ratio between the number of spirals of windings 9 and 51, while the transformation ratio in reception is linked to the ratio between the sum of the number of spirals of windings 51, 52, and 53 and the number of spirals of winding 9. Preferably, this ratio in reception is equal to 1.

The rest of the circuit has a structure similar to the structure illustrated in relation with FIG. 7. A difference however is that RC circuits 25 and 27 are connected to the respective free ends B, A of windings 53 and 52 that are distinct from terminals E and F to which resistors Ra are connected.

Another difference has to do with the ratios between the respective values of the filter resistances and capacitances. Indeed, to now respect the echo subtraction function coming from the transmission, the values of the resistances and capacitances of circuits 24, 25, 26 and 27 are all identical (R, C). Similarly, capacitors 31 and 32 have C as a value and resistor 33 has 2R as a value.

It should be noted that the choice of identical values R and C for impedances 24, 25, 26, and 27 is an embodiment simplifying the determinations by calculation of the values to be given to the different components. It should however be noted that the values of impedances 24 and 26 depend, among others, on the impedances of the lines for which the hybrid circuit is provided. Thus, according to the mean value of these line impedances and to their variation range, the system can be optimized for a line family by providing, for the components of impedances 24 and 26 that correspond to the impedances intervening on the estimated echo present across terminals Tx+ and Tx−, values different from those of the components of impedances 25 and 27 that correspond to the impedances intervening on the real echo across terminals A and B. More specifically, the ratio between the real parts of impedances 24 and 26 (and between those of impedances 26 and 27) and the ratio between their imaginary parts will be adapted, these ratios being likely to be different from each other. The value determination will be performed, in practice, based on simulations on lines modeled by impedances to optimize the performances of the hybrid circuit for the chosen characteristic mean line impedance value and the variation range of these characteristic impedances. This optimization may of course be implemented in the embodiments previously described in relation with FIGS. 7 and 8. The ratios between impedances 24 and 25 (24' and 25') and between impedances 26 and 27 (26' and 27') will then be slightly different from 2.

A multiple-winding transformer such as illustrated in FIG. 9 thus appears not only to have the advantage of not attenuating the signal in reception while enabling an elevation of the voltage level in transmission, but also to enable, downstream, a structure of the echo cancellation circuit that contributes to increasing the reception level. Indeed, the reception transmittance of the echo cancellation circuit now is higher than with a diagram such as illustrated in FIG. 7.

It should be noted that a transformer 50 such as illustrated in FIG. 9 may also have the structure illustrated in FIG. 8, that is, windings 9 and 51 may include intermediary capacitors.

On the collective equipment side, the embodiment of FIG. 9 can be transposed by replacing capacitors C of impedances 24, 25, 26, 27, 31, and 32 with inductances L to obtain a low-pass filter (the change of values C' and L' to pass from a high-pass function to a low-pass filter does not modify the diagram). However, the number of inductances that are then necessary may be considered as being too high.

Figure 10:
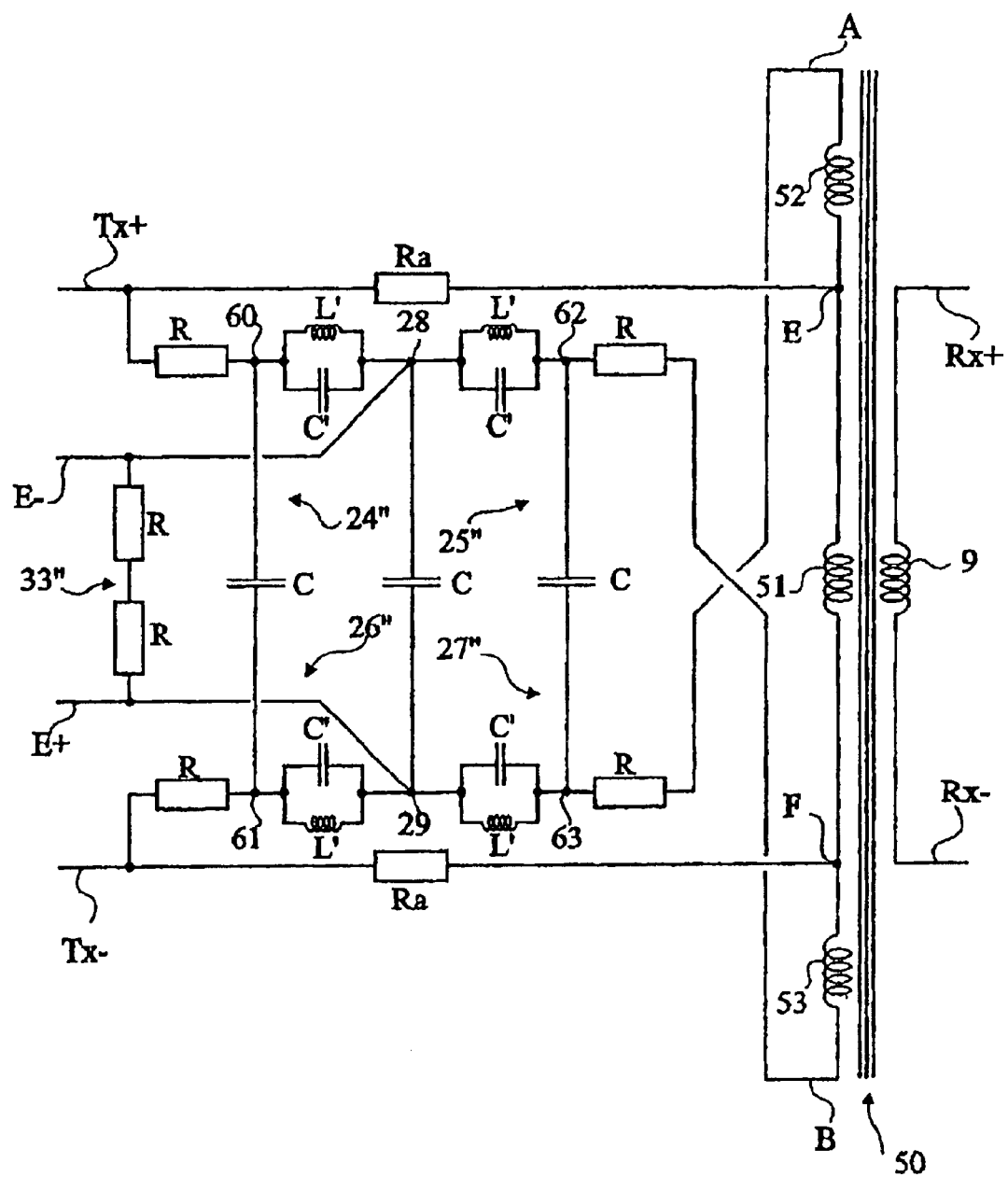
FIG. 10 shows a fourth embodiment of a hybrid circuit intended for a collective equipment according to the second aspect of the present invention.

Thus, according to a fourth embodiment illustrated in FIG. 10, applied to a low-pass filtering, the present invention provides forming impedances 24'', 25'', 26'', and 27'' in the form of RLC circuits each formed of a resistor R, in series with a parallel assembly of a capacitor C' and of an inductance L' and sharing two by two a capacitor C. More specifically, terminals Tx+ and Tx− are each connected, by a series association of a resistor R with a parallel assembly of an inductance L' with a capacitor C', to points 28 and 29. The midpoints 60 and 61 of these series associations are connected by a capacitor C participating in the definition of respective input impedances 24'' and 26''. On the real echo side, terminals A and B are each connected, by a series association of a resistor R with a parallel assembly of an inductance L' with a capacitor C', to points 28 and 29. The midpoints 62 and 63 of these series associations are connected by a capacitor C participating in the definition of respective input impedances 25'' and 27''. Points 28 and 29 are further interconnected by a capacitor C participating in the definition of the output impedances, capacitor C being in parallel with resistor 33''. In FIG. 10, to illustrate that each output impedance includes a resistor, resistor 33'' (33 or 33' of value 2R of FIGS. 7 to 9) has been shown in the form of two resistors of value R in series.

It should be noted that the different components have been identified by letters R, C, L', and C' having the same meaning as previously. Thus, inputs impedances 24", 25", 26" and 27", here include components C' and L' functionally performing the function of LC circuit 30' of FIG. 8. It should however be noted that, here again, the values of input impedances 24" and 26" may be different from those of input impedances 25" and 27" to optimize the circuit for the lines for which it is intended.

An advantage of the embodiment of FIG. 10 is that it minimizes the number of inductances necessary to form a circuit. In addition to the fact that it is generally preferable to use capacitors rather than inductances for reasons of bulk and cost, the use of capacitors enables a better circuit optimization by the larger choice of values in available series components.

It should be noted that points 28 and 29 are now directly connected to terminals E+ and E−. This can be an advantage for the forming of the hybrid circuit by simplifying the layout between the hybrid circuit and the receive head.

It should also be noted that the transformation of a circuit having a so-called Y structure (FIGS. 7, 8, 9) into a circuit having a so-called delta structure (FIG. 10) can also apply to the embodiment of FIG. 8 to minimize the number of inductances. In this case, the input impedances on the side of transmit head 12 include, each, a series association of a resistor 2R with a parallel assembly of a capacitor C'/2 and of an inductance 2L', the midpoints of the series associations being connected by a capacitor C/2. The input impedances on the transformer side include, each, a series association of a resistor R with a parallel assembly of a capacitor C' and of an inductance L', the midpoints of the series associations being connected by a capacitor C. The output impedances are formed of a capacitor C connecting points 28 and 29, mounted in parallel with resistor 33".

Of course, the present invention is likely to have various alterations, modifications, and improvements which will readily occur to those skilled in the art. In particular, the sizing of the different components of the hybrid circuit of the present invention is within the abilities of those skilled in the art based on the functional indications given hereabove and on the operating frequency ranges.

Further, although the present invention has been discussed hereabove in relation with a hybrid circuit intended for a high-rate data transmission of ADSL type, the present invention applies to any data transmission in separate bands.

Further, if a filter of order 3 is a preferred embodiment for the compromise provided between the filtering quality and the simplicity of assembly associated with the sharing of the input impedances with the subtraction function, filters of a different order may be used.

Finally, although, to make the discussion clearer, reference has been made to resistors, capacitors and inductances, these are not necessarily individual components but resistive, capacitive, and inductive elements that may be individually formed, respectively, of several resistors, capacitors, and inductances associated in series and/or in parallel. Similarly, the inductances (for example, L' of the input impedances of FIG. 10) may be associated two by two in a transformer to obtain a common mode rejection in the differential structure.

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

What is claimed is:

1. A hybrid circuit forming an interface between a transmission line and heads of transmission-reception of high frequency signals in bands of different frequencies in transmission and reception, the circuit comprising:

a line transformer;

band separating means for separating the transmission and reception bands wherein the band separation means comprises echo cancellation means;

first and second input terminals;

first and second output terminals; and a resistor connected between said output terminals;

wherein said transformer includes first and second end terminals and said band separating means include a filter that includes:

first and second input impedances connected between said first end terminal and said first input terminal, said first and second input impedances being connected to each other at a first midpoint that is connected to said first output terminal;

third and fourth input impedances connected between said second end terminal and said second input terminal, said third and fourth input impedances being connected to each other at a second midpoint that is connected to said second output terminal, wherein each input impedance includes a series association of a resistor with a parallel assembly of a first capacitor with an inductance; and a second capacitor connected between said first and second midpoints.

2. The circuit of claim 1 wherein the filter and echo cancellation means include components that are sized independently from an impedance of the line and from a transformation ratio of the transformer.

3. The circuit of claim 1, wherein the filter is of third order.

4. A hybrid circuit forming an interface between a transmission line and heads of transmission-reception of high frequency signals in bands of different frequencies in transmission and reception, the circuit comprising:

a line transformer;

band separation means having echo cancellation means;

first and second input terminals;

first and second output terminals; and a resistor connected between said output terminals;

wherein said transformer includes a winding with first and second end terminals and said band separating means include a filter that includes:

first and second input impedances connected between said first end terminal of the winding of the transformer and said first input terminal of the circuit, said first and second input impedances being connected to each other at a first midpoint;

third and fourth input impedances connected between said second end terminal of the winding and said second input terminal, said third and fourth input impedances being connected to each other at a second midpoint;

an LC cell connected between said first and second midpoints;

a first capacitive or inductive element connected between said first midpoint and said first output terminal; and a second capacitive or inductive element connected between said second midpoint and said second output terminal.

5. The circuit of claim 4 wherein each input terminal of the circuit is connected by a drive resistor, having a resistance depending on an impedance of the line and on a transformation ratio of the transformer in transmission, to a terminal of the winding of the transformer.

6. The circuit of claim 1, wherein the band separating means are formed of a high-pass filter.

7. The circuit of claim 1, wherein the band separating means are formed of a low-pass filter.

8. The circuit of claim 1, wherein the transformer is formed of at least three series windings having respective numbers of spirals.

9. A hybrid transceiver circuit, comprising:
   first and second input terminals for receiving an input signal having a frequency within a first frequency range;
   first and second output terminals for transmitting an output signal having a frequency within a second frequency range;
   a transformer with first and second terminals; and
   a filter that includes:
   first and second input impedances connected between the first terminal of the transformer and the first input terminal, the first and second input impedances being connected to each other at a first midpoint that is coupled to the first output terminal;
   third and fourth input impedances connected between the second terminal of the transformer and the second input terminal, the third and fourth input impedances being connected to each other at a second midpoint that is coupled to the second output terminal; and
   a reactance element connected between the first and second midpoints.

10. The circuit of claim 9 wherein the reactance element includes an LC cell.

11. The circuit of claim 9 wherein the filter further includes:
    a first output reactance element connected between the first midpoint and the first output terminal; and
    a second output reactance element connected between the second midpoint and the second output terminal.

12. The circuit of claim 11 wherein the filter further includes a resistance element connected between the first and second output terminals.

13. The circuit of claim 9, further comprising:
    a first resistor coupled between the first input terminal and the second terminal of the transformer; and
    a second resistor coupled between the second input terminal and the first terminal of the transformer.

14. The circuit of claim 9 wherein the transformer includes a first winding coupled between the first terminal and a third terminal, a second winding coupled between the third terminal and a fourth terminal, and a third winding coupled between the second and fourth terminals, the circuit further comprising:
    a first resistor coupled between the first input terminal and the fourth terminal; and
    a second resistor coupled between the second input terminal and the third terminal.

15. The circuit of claim 9 wherein each of the input impedances includes:
    a parallel circuit of an inductor in parallel with a capacitor; and
    a resistor connected to the parallel circuit.

16. The circuit of claim 9 wherein the first input impedance includes a first resistance coupled to a first reactance at a first node, the second input impedance includes a second resistance coupled to a second reactance at a second node, the third input impedance includes a third resistance coupled to a third reactance at a third node, and the fourth input impedance includes a fourth resistance coupled to a fourth reactance at a fourth node, the filter further comprising a fifth reactance connected between the first and third nodes and a sixth reactance connected between the second and fourth nodes.

17. A telecommunications system, comprising:
    a first communication device that includes a signal processing circuit, first and second output terminals, and first and second input terminals;
    a communication line that connects the first communication device to a second communication device, the communication line having first and second wires; and
    a hybrid transceiver circuit connecting the first communication device to the communication line, the hybrid transceiver circuit including:
    first and second input terminals coupled respectively to the first and second output terminals of the first communication device;
    first and second output terminals coupled respectively to the first and second input terminals of the first communication device;
    a transformer having first and second windings magnetically coupled to each other, the first winding being connected across the wires of the communication lines and the second winding having first and second end terminals;
    first and second input impedances connected between the first terminal of the transformer and the first input terminal, the first and second input impedances being connected to each other at a first midpoint that is coupled to the first output terminal;
    third and fourth input impedances connected between the second terminal of the transformer and the second input terminal, the third and fourth input impedances being connected to each other at a second midpoint that is coupled to the second output terminal; and
    a reactance element connected between the first and second midpoints.

18. A hybrid transceiver circuit, comprising:
    a first winding terminal and a second winding terminal;
    first and second input terminals for receiving an input signal;
    first and second output terminals for providing an output signal;
    a first impedance matching resistor connected between the first input terminal and the first winding terminal;
    a second impedance matching resistor connected between the second input terminal and the second winding terminal;
    a subtractor circuit having an output coupled to the first and second output terminals;
    a first filter circuit coupled between the first and second input terminals and the subtractor circuit; and
    a second filter circuit coupled between the first and second winding terminals and the subtractor circuit.

19. The circuit of claim 18 wherein the first filter circuit comprises a high-pass filter.

20. The circuit of claim 18 wherein the first filter circuit comprises a low-pass filter.

21. The circuit of claim 18 further comprising a transformer coupled to the first and second winding terminals.

22. A hybrid circuit forming an interface between a transmission line and heads of transmission-reception of high frequency signals in bands of different frequencies in transmission and reception, the circuit comprising:

a line transformer;

band separation means having echo cancellation means; and first and second input terminals;

wherein said transformer includes a winding with first and second end terminals and said band separation means includes:

first and second input impedances connected in series between said first end terminal of the winding of the transformer and said first input terminal, said first and second input impedances being connected together at a first midpoint;

third and fourth input impedances connected in series between said second end terminal of the winding of the transformer and said second input terminal, said third and fourth input impedances being connected together at a second midpoint; and a reactance element connected between said first midpoint and said second midpoint.

23. The circuit of claim 22 wherein said reactance element is passive.

* * * * *